United States Patent [19]

McNamara et al.

[11] Patent Number: 5,818,725
[45] Date of Patent: *Oct. 6, 1998

[54] SYSTEM FOR UTILITY DEMAND MONITORING AND CONTROL

[75] Inventors: Robert P. McNamara, San Jose; Peter T. Loc, Santa Clara; Donald G. Marquart, Covington; Francis R. Simoneau, San Jose, all of Calif.

[73] Assignee: First Pacific Networks, San Jose, Calif.

[*] Notice: The term of this patent shall not extend beyond the expiration date of Pat. No. 5,528,507.

[21] Appl. No.: 785,311

[22] Filed: Jan. 21, 1997

Related U.S. Application Data

[63] Continuation-in-part of Ser. No. 613,871, Mar. 11, 1996, which is a continuation of Ser. No. 104,750, Aug. 11, 1993, Pat. No. 5,528,507.

[51] Int. Cl.[6] ............................. G01R 21/00; G08C 15/00
[52] U.S. Cl. ..................... 364/483; 702/62; 340/870.02; 340/870.12; 340/870.13
[58] Field of Search ..................... 364/483, 492, 364/493, 514 C; 340/870.02, 870.03, 870.12, 870.13, 870.07, 870.08, 310 R, 310 A, 825.54; 370/29, 30, 60, 85.6, 95.1; 379/106, 107

[56] References Cited

U.S. PATENT DOCUMENTS

| | | | |
|---|---|---|---|
| 3,692,942 | 9/1972 | Inose et al. | 370/95.1 |
| 4,644,320 | 2/1987 | Carr et al. | 340/310 A |
| 4,724,435 | 2/1988 | Moses et al. | 340/870.13 |
| 4,757,460 | 7/1988 | Bione et al. | 364/514 |
| 4,792,946 | 12/1988 | Mayo | 370/86 |
| 4,803,632 | 2/1989 | Frew et al. | 364/464.04 |
| 4,804,957 | 2/1989 | Selph et al. | 340/870.03 |
| 4,833,618 | 5/1989 | Verma et al. | 364/483 |
| 4,860,379 | 8/1989 | Schoeneberger et al. | 340/825.54 X |
| 5,025,442 | 6/1991 | Lynk et al. | 370/29 |
| 5,040,175 | 8/1991 | Tuch et al. | 370/85.2 |
| 5,101,191 | 3/1992 | Mac Fadyen et al. | 340/310 R |
| 5,130,978 | 7/1992 | Mobasser | 370/60 |
| 5,179,376 | 1/1993 | Pomatto | 340/870.02 |

(List continued on next page.)

FOREIGN PATENT DOCUMENTS

| | | |
|---|---|---|
| A 0019287 | 11/1980 | European Pat. Off. . |
| A 0265342 | 4/1988 | European Pat. Off. . |
| A 0407902 | 1/1991 | European Pat. Off. . |
| A 0503464 | 9/1992 | European Pat. Off. . |
| 2677469 | 12/1992 | France . |
| A 9512911 | 5/1995 | WIPO . |

OTHER PUBLICATIONS

Electrotechnik Und Informationstechnik, vol. 107, No. Jul. 8, 1990 – 190, Wien, pp. 371–378, XP000150972 Hackl: "entwicklungstendenzen der modernen betriebsführungstechnik" * the whole document *.

*Primary Examiner*—Melanie Kemper
*Attorney, Agent, or Firm*—Townsend and Townsend and Crew LLP

[57] ABSTRACT

A system for electric power demand monitoring and control includes one or more data distribution networks interconnecting network interfaces or intelligent utility units located at customer sites with a host computer located in the utility company offices. A network within the site interconnects each intelligent utility unit or network interface with power consuming units for providing data on power usage and power control. A data distribution network interconnects the plurality of intelligent utility units or network interfaces to the host computer as a head end unit, the data distribution network providing downstream communication channels from the host computer to the plurality of intelligent utility units and network interfaces, and upstream communication channels from the plurality of intelligent utility units and network interfaces to the host computer. The communication channels are organized as frequency division multiplex channels in a frequency spectrum. A plurality of distribution networks can be provided for a larger utility environment with each distribution network associated with a power substation and customers served by the power substation.

15 Claims, 8 Drawing Sheets

U.S. PATENT DOCUMENTS

| | | | |
|---|---|---|---|
| 5,189,694 | 2/1993 | Garland | 379/106 |
| 5,193,091 | 3/1993 | Crisler et al. | 370/95.1 |
| 5,229,992 | 7/1993 | Jurkevich et al. | 370/60 X |
| 5,239,575 | 8/1993 | White et al. | 340/870.02 X |
| 5,252,967 | 10/1993 | Brennan et al. | 340/870.02 |
| 5,301,122 | 4/1994 | Halpren | 364/483 |
| 5,303,237 | 4/1994 | Bergman et al. | 370/85.6 |
| 5,528,507 | 6/1996 | McNamara et al. | 364/483 |

SYSTEM FOR UTILITY DEMAND MONITORING AND CONTROL

CROSS-REFERENCE TO RELATED APPLICATIONS

This patent application is related to the following patents of the present assignee:

U.S. Pat. No. 5,084,903, issued Jan. 28, 1992 for MODULATION AND DEMODULATION SYSTEM EMPLOYING AM-PSK AND QPSK COMMUNICATION SYSTEM USING DIGITAL SIGNALS;

U.S. Pat. No. 5,088,111, issued Feb. 11, 1992 for MODULATION AND DEMODULATION SYSTEM EMPLOYING AM-PSK AND FSK FOR COMMUNICATION SYSTEM USING DIGITAL SIGNALS;

U.S. Pat. No. 5,487,066, issued Jan. 23, 1996 for DISTRIBUTION INTELLIGENCE NETWORK USING TIME AND FREQUENCY MULTIPLEXING; and U.S. Pat. No. 5,272,700 issued Dec. 21, 1993 for SPECTRALLY EFFICIENT BROADBAND TRANSMISSION SYSTEM.

All of the above related patents are expressly incorporated herein by reference for all purposes. This application is a continuation-in-part of U.S. application Ser. No. 08/613,871 filed Mar. 11, 1996 which is in turn a continuation of U.S. application Ser. No. 08/104,750, filed Aug. 11,1993, now U.S. Pat. No. 5,528,507 issued on Jun. 18, 1996, both parent applications being entitled SYSTEM FOR UTILITY DEMAND MONITORING AND POWER CONTROL. U.S. Pat. No. 5,528,507 is expressly incorporated herein by reference for all purposes.

BACKGROUND OF THE INVENTION

This invention relates to a system for monitoring and controlling customer power demand in a utility such as electric, gas, and water, and more particularly the invention relates to an information distribution network for use in such a system which allows the connection and disconnection of customers in the utility, the collection and transmission of user demand requirements, and the control of user demand for utility services.

Domestic demand for electric power is growing at approximately 2% annually. Although utility companies can maintain pace with this growth by constructing more peaking and power plants, this is not necessarily in the best interest of the utility companies and society at large. The factors of cost, fuel availability, and environmental concerns of both the utility company and the public in general have prompted a shift of emphasis from building additional generation capacity for satisfying the increasing demand to developing and employing a method and means of efficiency improvements, production facility optimization, and electrical conservation through demand side management. Implicit in this is the fact that not all electric power costs the same to generate. Power generated during peak times is more expensive than "base-line" power. For demand side management, utility companies will charge on a cost basis rather than an average use basis that has existed in the past.

Heretofore, systems have been proposed for communicating utility usage at a customer's home to a central office. For example, U.S. Pat. No. 4,086,434 discloses a remote condition reporting system including a microprocessor with memory and a firmware program, telephone dialing equipment, a clock, and a plurality of inputs from meter readings and the outputs of sensors. The system initiates telephone calls to the utility company central offices at predetermined intervals to report utility usage including time of day power usage metering.

Telephone line interface between users and a central control station has a number of limitations including slow transmission and low user saturation levels. Moreover, the centrally switched telephone system is not capable of providing simultaneous two-way communication with an entire service area population. Wireless radio systems have limited bandwidth and thus limited applications and flexibility.

The present invention is directed to a monitoring and control system in which communication occurs through a fully distributed digital telecommunications switch without a centralized routing and handling facility. The distribution network is deployable to large numbers of residential and commercial customers for bi-directional real-time communication. While initially designed for use with an electric power utility, the invention is applicable in monitoring and controlling demand for other utilities such as gas or water, as well as for data services.

SUMMARY OF THE INVENTION

In accordance with one embodiment of the invention, a controlled load management and feedback system includes a power company central computer facility, a plurality of site monitoring and control networks, and one or more wide band distribution networks interconnecting site monitoring and control networks and the central computer facility. The distribution networks connect to one or more central computer systems through substation gateways via high-speed digital lines.

The site monitoring and control network is located and operated within the power utility customer's facility and includes electrical control, monitoring, and measurement devices which allow the utility to monitor electrical consumption in real time, assist the customer in optimizing electrical power consumption, and communicate real-time consumption and changes in consumption to the power utility via the distribution network. Further, the site network permits automatic meter reading and remote service disconnect and reconnect.

The site network may be a home network, located at a customer's home. The distribution network includes a wire-based (hybrid fiber/coaxial cable) distribution system and an intelligent utility unit (IUU) which interfaces with the home network. The IUU controls, communicates, and configures devices within the home network, and communicates information from the home network back to the utility central computer via the distribution system. The distribution network is configured in cells or small hubs which support 250–2,000 users at a time.

The site network may also be a facility network, located in a customer industrial or commercial facility. The distribution network is substantially similar to the home application. However, to accommodate a greater number of electrical systems to be monitored and controlled, the functionality of the IUU is preferably implemented as a combination of a network interface (NI) and power monitor and control unit (PM).

The utility central computer includes a T-based communication digital backbone network which communicates with a distribution network through gateways typically located within a power substation. The backbone network consolidates traffic from different substations and routes the traffic to the utility host computer, thus providing access to every user on the system. The host computer is able to forecast trends and predict when demand will exceed supply, thus allowing corrective action to be taken. The computer can also generate reports for utility management and consumers showing usage and savings through demand management.

The invention and objects and features thereof will be more fully understood from the following detailed description and the appended claims when taken with the drawing.

DESCRIPTION OF SPECIFIC EMBODIMENTS

Figure 1:
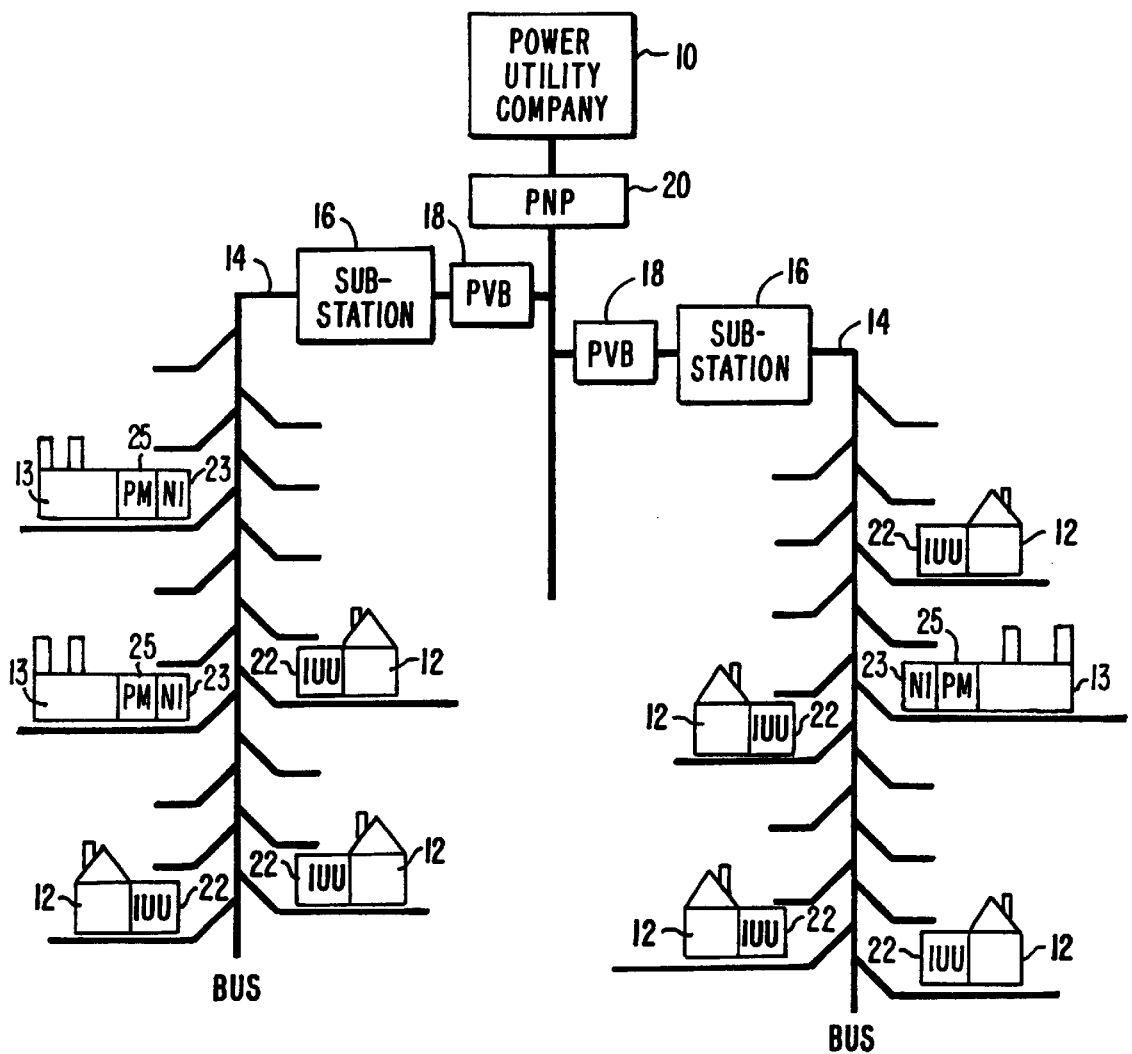
FIG. 1 is a schematic illustration of an electric power demand monitoring and control system in accordance with one embodiment of the present invention.

Referring now to the drawings, FIG. 1 is a functional diagram illustrating a power monitoring and control system in accordance with one embodiment of the invention. Communication in the system is between a mainframe host computer 10 at the power utility company central offices, the homes 12 of customers serviced by the utility as well as industrial and/or commercial facilities 13 serviced by the utility. The home network or facility network for each customer includes electrical control, monitoring, and measurement devices.

An intelligent utility unit (IUU) 22 located at each home 12 allows the host computer 10 to monitor electrical consumption in real time and help the customer optimize electrical power consumption. The IUU communicates with the host computer 10 through a bi-directional data distribution network 14 which is connected at a substation 16 through a bridge 18 to the digital backbone network of the utility company, which is in turn connected to a Bridged Gateway interface 20 of the host computer 10. At the industrial facilities 13, a network interface (NI) 23 similarly communicates to the host computer 10. A power monitor and control unit (PM) 25 located at the facilities 13 monitors the electrical consumption and assists in optimizing power distribution. The distribution network 14 comprises a coaxial or optical fiber cable in which there is a plurality of time and/or frequency division multiplexed channels. The digital backbone network may be a combination of copper and high volume fiber optic cables. The digital backbone network runs over high-speed digital lines.

Figure 2A:
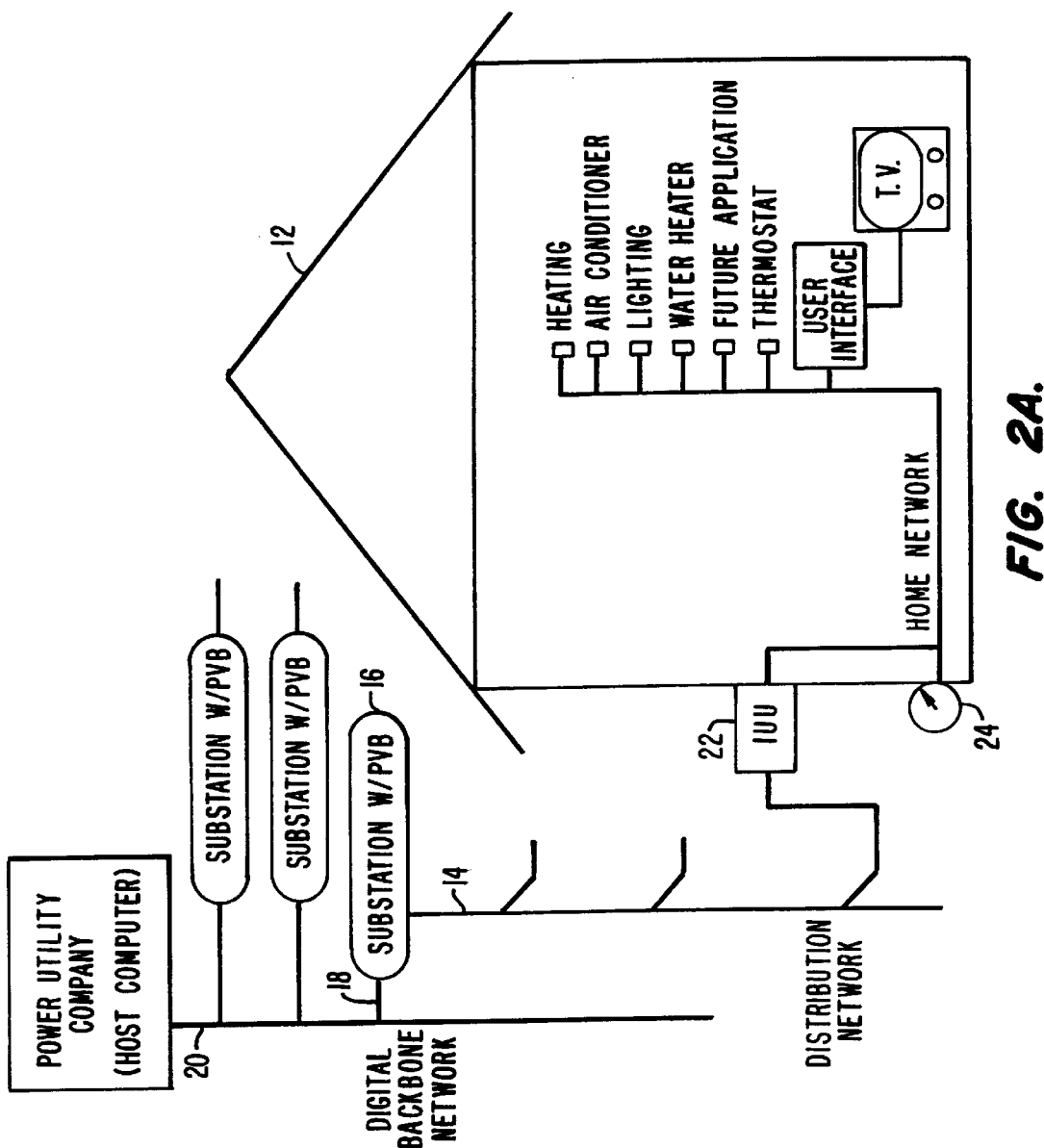
FIG. 2A is a schematic illustration of the home monitoring and control network in the system of FIG. 1.

FIG. 2A is an illustrative embodiment of the home network located at each customer's home. The IUU 22 is the interface between the home network and the distribution network 14. The home network includes electrical control, monitoring, and measurement devices located and operated within the customer's home. Although FIG. 1 and FIG. 2A indicate that each home has an associated IUU, an IUU may be shared among several homes. An electronic power meter 24 allows the reading of total power consumed to date, total power being consumed at present, and the change in power consumed from the last period monitored. Power disconnect and reconnect of the electronic power meter is controlled at the power utility company central office through the host computer 10. The IUU is further connected to sensors and switches connected to the home heating, air conditioning, lighting, water heater, thermostat, and other internal circuits, as illustrated. Further, an optional user interface is provided with a readout provided by the television set or LCD panel, for example.

In the preferred embodiment, the home network incorporates a 5Kbps LonWorks® powerline carrier data path available from Echelon™ Inc. of Palo Alto, Calif. Electronic power meter 24 is preferably a Powerlon® meter available from American Innovations™ of Austin, Tex. Within the IUU, the interface to the distribution network is preferably provided by a system similar to the voice interface unit described in U.S. Pat. No. 5,487,066. However, the circuitry in the voice interface unit used to convert voice to and from data is unnecessary in power management and control operations.

Figure 2B:
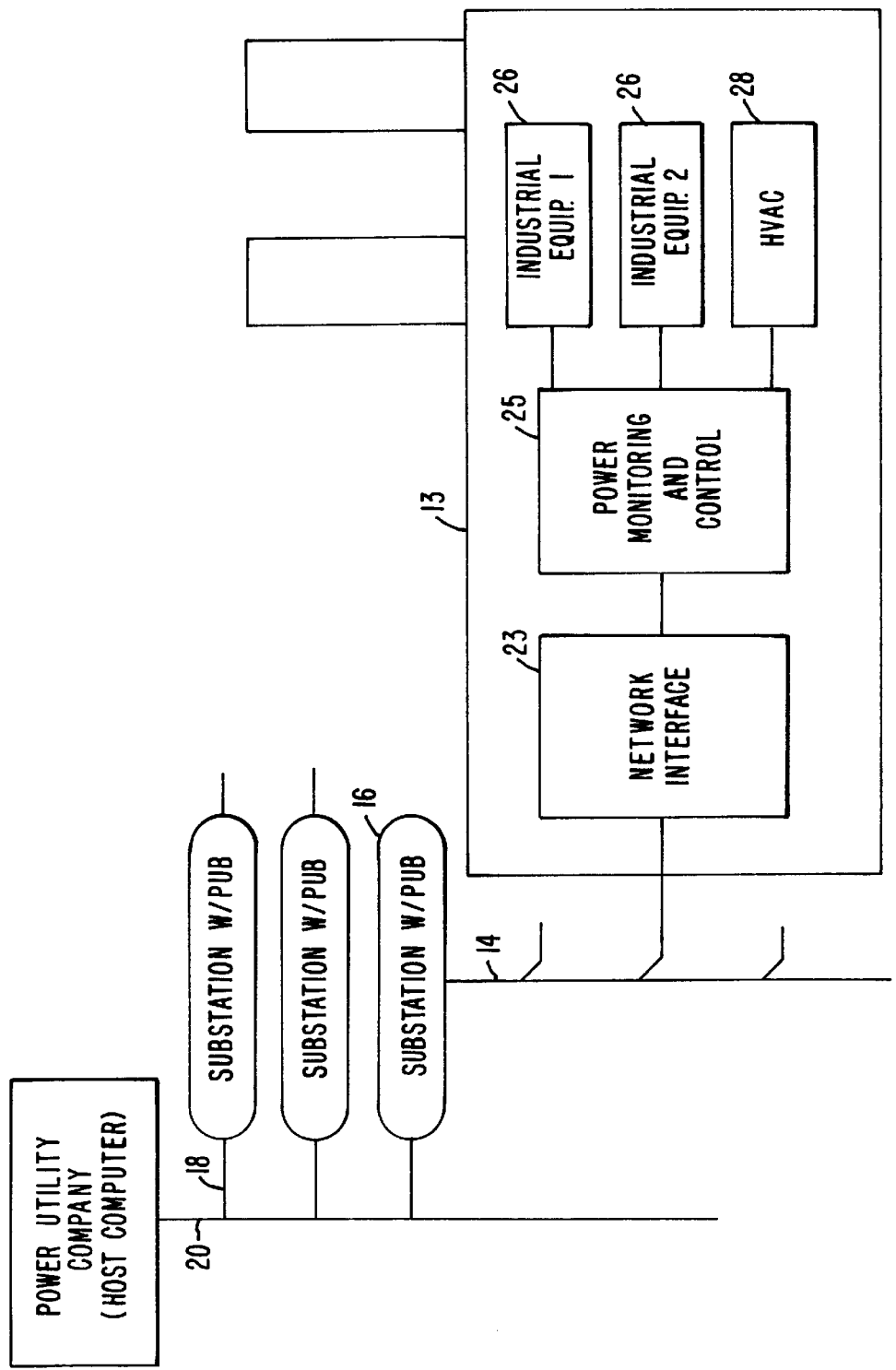
FIG. 2B is a schematic illustration of the industrial facility monitoring and control network in the system of FIG. 1.

FIG. 2B is a schematic illustration of the industrial facility monitoring and control network in the system of FIG. 1. Here, network interface 23 serves as the connection between power monitor 25 and distribution network 14. Network interface 23 incorporates the non-voice functionality of the voice interface unit of U.S. Pat. No. 5,487,066. Power monitor 25 is connected to industrial equipment 26 and may be connected to an HVAC unit 28. Power monitor 25 operates to obtain power usage information from industrial equipment 26 and HVAC unit 28. Power monitor 25 may also be connected to lights, water heaters etc. and may also monitor water and/or gas consumption. Power monitor 25 records current and historical power usage information for the monitored equipment. Like in the home system, electrical usage may be metered with the Powerlon devices and interconnections between power monitor 25 and the various Powerlon devices or other monitoring and control devices may be provided by the LonWorks power carrier line data path.

Figure 3A:
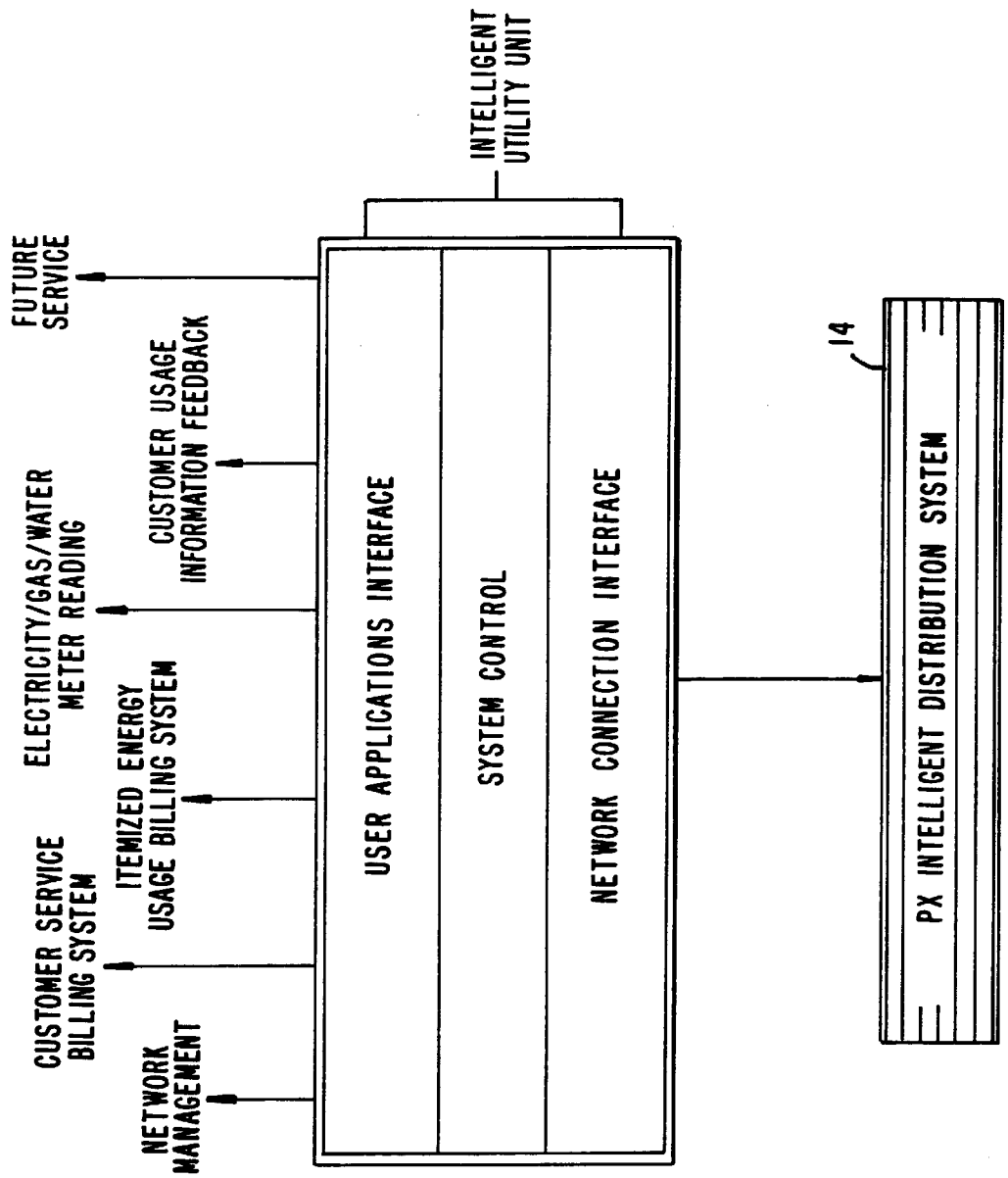
FIG. 3A functionally illustrates the intelligent utility unit (IUU) in the home network of FIG. 2A.
Figure 3B:
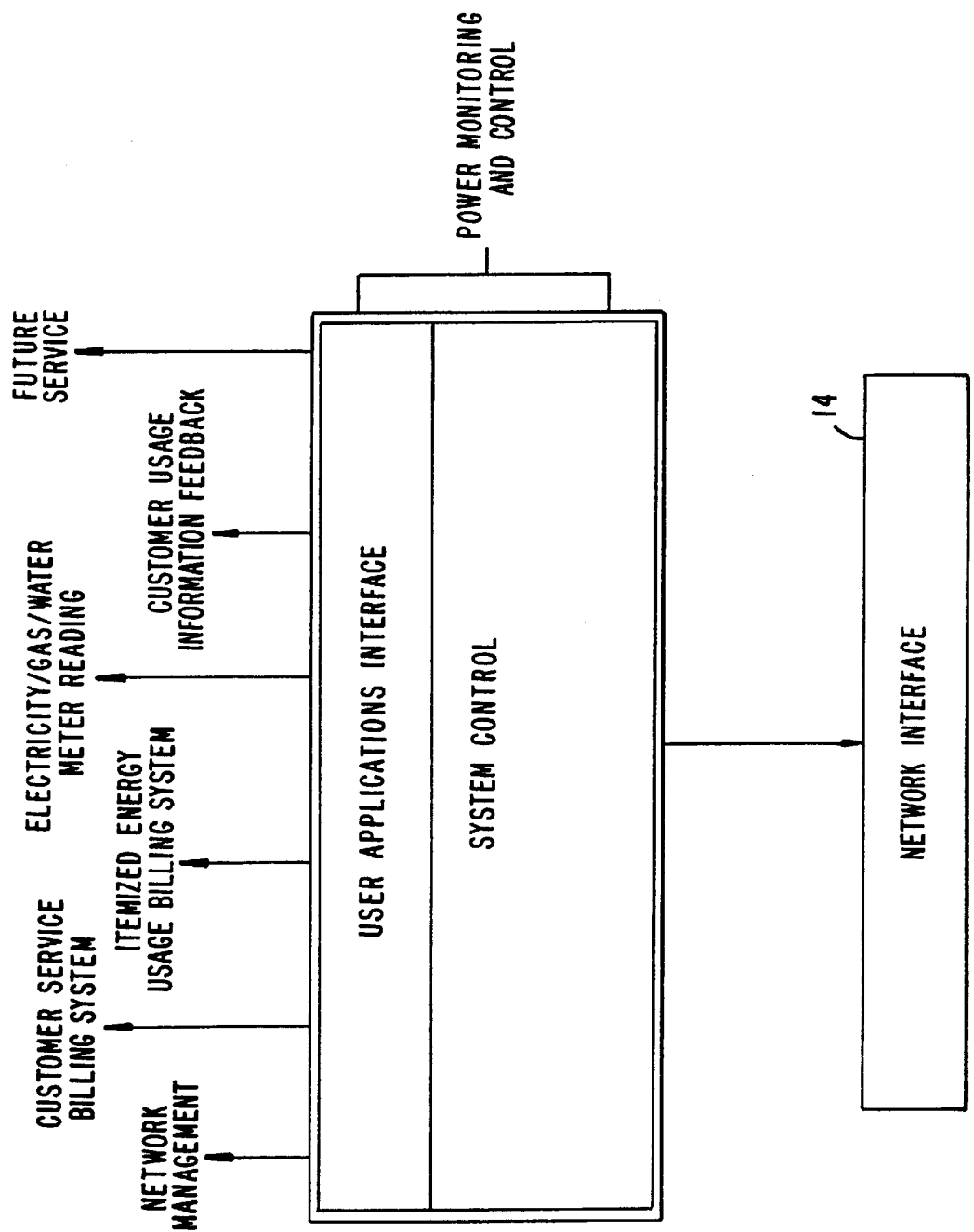
FIG. 3B functionally illustrates the Power Monitor and Control Unit in the industrial facility monitoring and control network in the system of FIG. 2B.

FIG. 3A is a functional diagram of the IUU in interfacing with the home network and the distribution network 14. FIG. 3B is a functional diagram of power monitor 25 interfacing with the facility network and network interface 23. In comparing FIGS. 3A and 3B, it can be seen that the IUU for home application essentially combines the functions of power monitor 25 and network interface 23.

Figure 4:
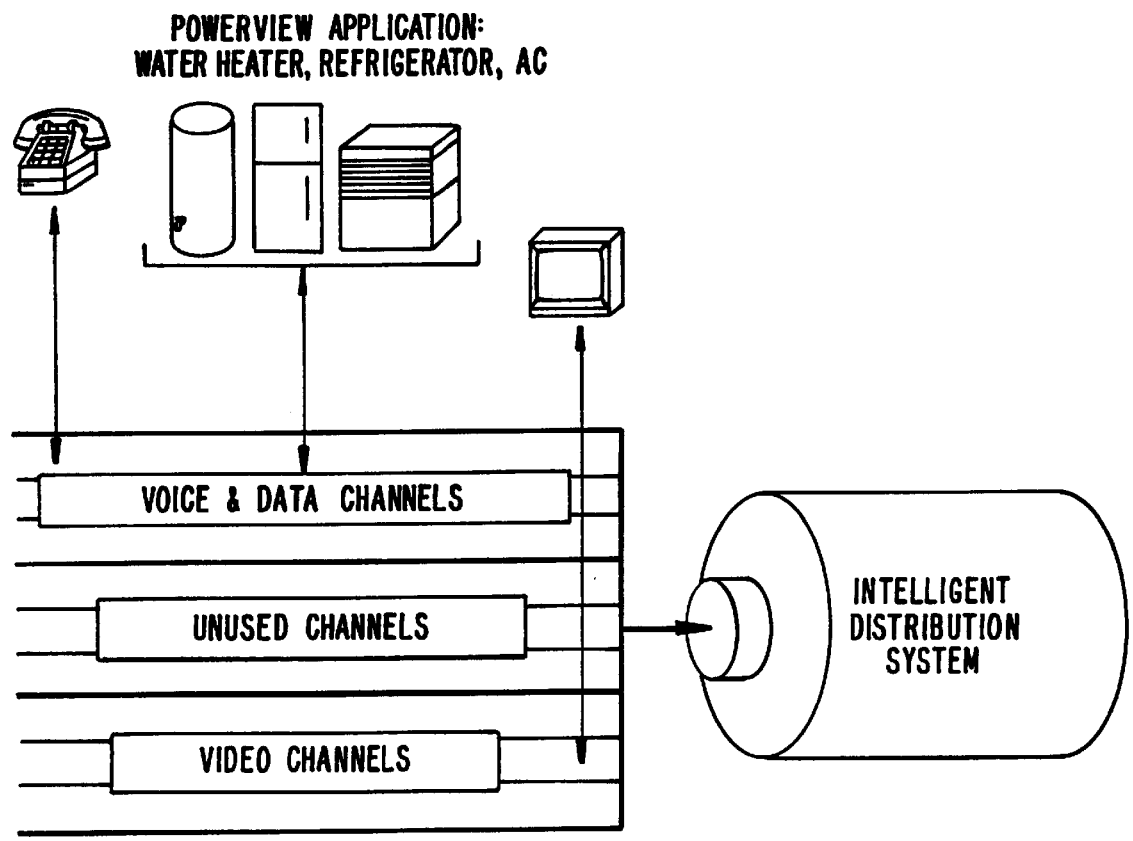
FIG. 4 functionally illustrates bandwidth allocations for the home or facility network in the distribution system.

The distribution network allows a wide variety of digital information processing devices plus simultaneous switched voice (telephone), data, and full motion NTSC video services to communicate simultaneously over a single wiring system as illustrated by the bandwidth allocation of FIG. 4. The distribution network comprises a single high-speed digital bus with the channel bandwidth allocated into time slots, signalling bandwidth, and overhead functions. A plurality of 5.018 MBPS data streams are provided with each data stream organized to include 28 full duplex time slots utilizing 3.584 MBPS bandwidth and which can be allocated for voice or data traffic. An out-of-band signalling channel operating at approximately 640 KBPS is shared by all units on the network for configuration and call processing information exchange. Further, bandwidth set aside for overhead functions such as relative system timing, time slot preambles, and time slot and signal bandwidth synchronization is included in each 5.018 MBPS stream. For data applications, a fixed number of time slots, typically between 1 and 8 and up to a maximum of 24 are permanently allocated and configured for data services on the distribution portion of the network. These time slots are shared between all IUUs on the network. In essence, a portion of the network bandwidth is allocated for data LAN services. When a time slot is allocated for data services, either or both the forward and reverse time slots, i.e., both ends of the full duplex time slot, can be allocated and used for data transmission. Under this convention allocation of additional time slots for data services increases the LAN speed by 64 KBPS per time slot.

Since the distribution network is structured like a bus oriented LAN, random access or control contention is required to manage access to the IUUs. Either a carrier sense multiple access (CSMA) or a carrier sense multiple access with collision detection (CSMA/CD) access mechanism is employed. In CSMA, a node listens for network traffic and if nothing is heard, packets are sent to the host computer. Problems can occur when multiple nodes send before activity can be detected. In CSMA/CD, senders listen while transmitting, and back off and retransmit when collisions are detected. Throughput is high, ranging between 80% and 90%. The selection between CSMA and CSMA/CD is based on the tradeoff between enhancement and performance achieved by using a CSMA/CD mechanisms versus the issues of cost and implementation as compared with CSMA. The important consideration for a network access method is that it should be stable under heavy loads, i.e., it should back off for longer periods of time during peak operation. The longer backup times should not affect network operation since time access of most applications are near real time even under heavy load conditions. Any combination of fiber, coax, and wireless transmission may be used as the physical medium of the distribution network.

Figure 5:
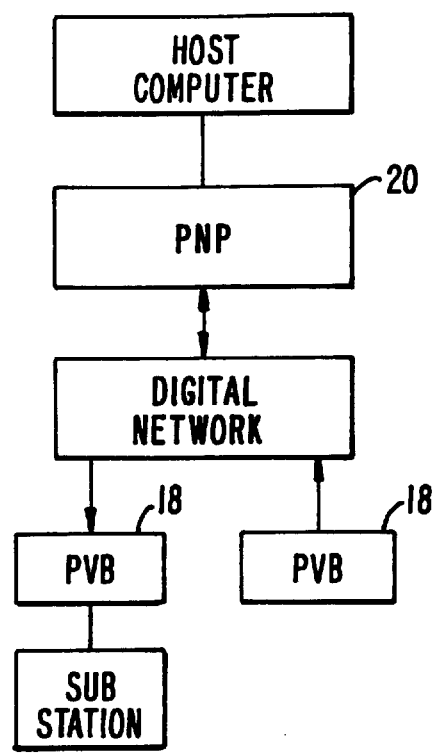
FIG. 5 illustrates the bi-directional distribution network.

FIG. 5 illustrates the bi-directional full duplex organization of the distribution network. The radio frequency spectrum is typically divided into outbound or downstream from the host computer head end of the cable towards the end user devices and inbound or upstream from the end user devices towards the head end. The RF spectrum on the cable can be organized in one of three ways: sub-split, mid-split, or high-split. These terms refer to the particular segments of the RF spectrum used.

In a sub-split system, the frequencies from 5 to 30 MHz (4 channels) are used to carry signals in the inbound directions and the frequencies from 50 MHz to 1 GHz (80+ channels) are used to carry signals in the outbound direction. This is illustrated in Table 1.

In a mid-split system, the frequencies from 5 to 108 MHz (17 channels) are used to carry signal in the inbound direction, and the frequencies from 162 MHz to 1 GHz (50+channels) are used to carry signals in the outbound direction. See Table 2 for a representative mid-split cable spectrum.

In a high-split system, the frequencies from 5 to 175 MHz (30 channels) are used to carry signals in the inbound direction, and the frequencies from 220 MHz to 1 GHz (35+channels) are used to carry signals in the outbound direction. See Table 3 for a representative high-split cable spectrum.

A multi-tiered addressing scheme is employed in the network. Each IUU contains the following address structure:

Physical unit address—six-byte address unique to every unit. The address is written in HEX and coded into each IUU.

Group address—allows addressing of assigned group less than all users.

Broadcast address—allows addressing of all system users.

This addressing structure allows the network manager to directly communicate with each individual IUU or network interface, a group of IUUs or network interfaces, and all IUUs or network interfaces.

Figure 6:
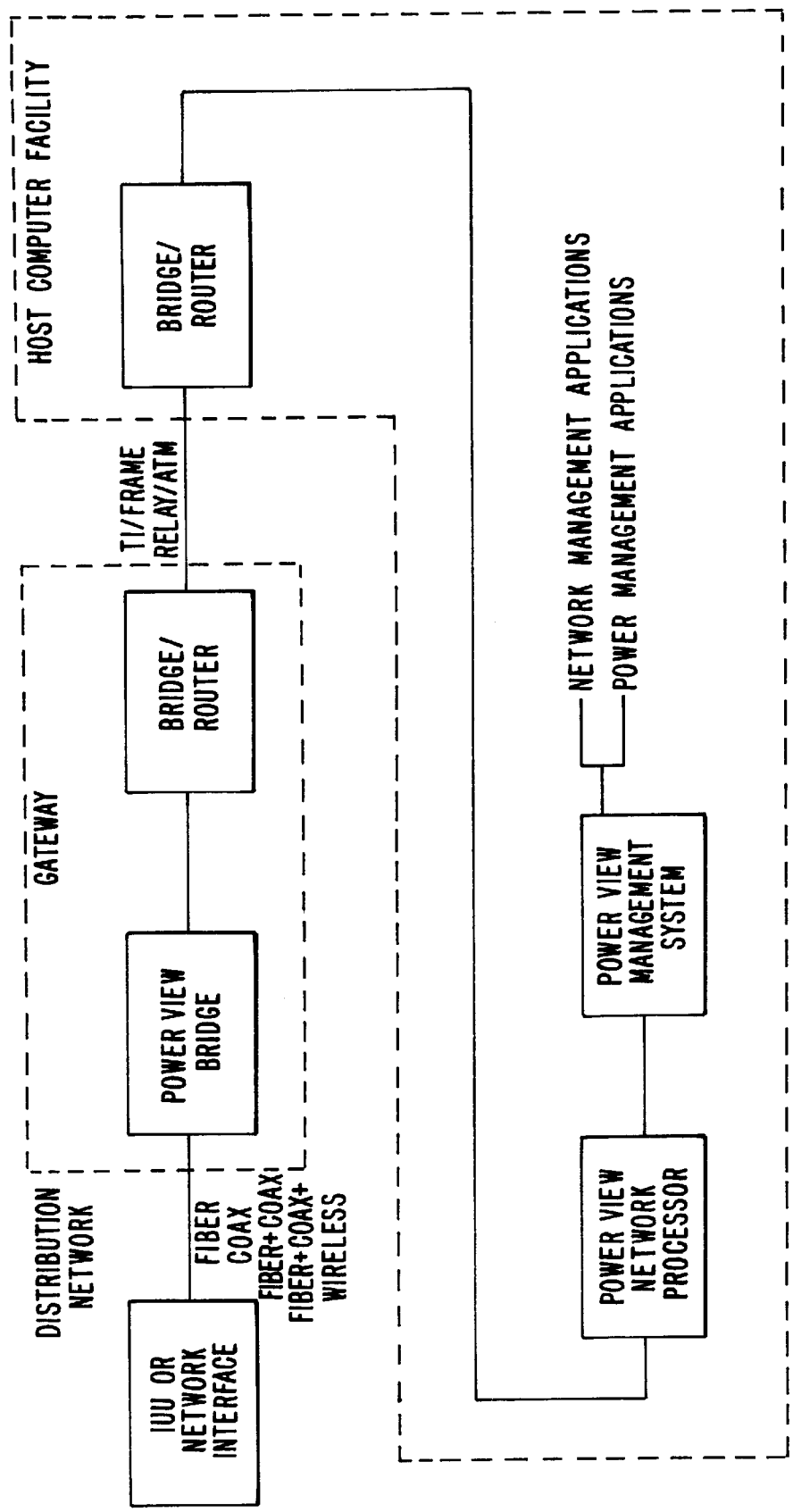
FIG. 6 is a functional block diagram of the distribution network and the digital backbone network which interfaces the host computer with the plurality of distribution networks.

FIG. 6 is a functional block diagram of the distribution network 600 and the digital backbone network 601 which interfaces the host computer with the plurality of distribution networks. A gateway 602 between the distribution network and the digital backbone interfaced to the host computer is typically but not necessarily located in the utility company substations. A PowerView bridge (PVB) 604 within gateway 602 provides the routing function between distribution network 600 and backbone network 601. PVB 604 keeps track of IUU and network interface addresses and the network processor address and performs the routing function for all packets between the networks. PVB 604 also performs a filtering function in passing data only to valid known addresses.

A first bridge/router 606 serves as an interface to backbone network 601. Bridge/router 606 incorporates a Frame Relay T1 interface for providing the interface between the gateway and the backbone network. A second bridge/router 608 interfaces between host computer facility 610 and PowerView Network Processor (PNP) which provides an interface between T1 data streams and a PowerView Management System 612 which provides the management of the overall network. Backbone network 601 can be organized as a star, ring or bus. The actual topology is not important since circuits will be dedicated from gateway 602 to host computer facility 610. Backbone network 601 preferably can operate from T-1 rates upwards and exceeding T-3 rates, depending upon network and utility size. The T1 network distribution media is twisted wire, optical fiber, coaxial cable, or microwave. The T3 networks are typically either fiber or microwave. Minimum network speed is T-1. Backbone network 601 may also employ ATM or Frame Relay technologies. Network addressing is a function of the circuits dedicated to the distribution network and a lower level addressing between the IUUs and the utility company's host computer.

PowerView Management System 612 includes the ability to collect information about time of day power consumption, the ability to remotely configure the home or facility network through the IUU, the ability to change the price tier in real time either up or down as a function of power generation and consumption, and the ability to collect and process the customer's utility bill which breaks down power consumption by device, time of day, override conditions, and the like in order to provide an itemized billing statement to the customer.

There has been described a system for utility demand monitoring and control and including a distribution network which facilitates demand side management of utility consumption. While the system has been described with reference to an illustrative electric power utility embodiment, the description is illustrative of the invention and is not to be construed as limiting the invention. The system can be used with other utilities such as gas and water as well as with telephone and cable television networks. Other functions are readily incorporated such as security systems. Thus, various modifications and applications will occur to those skilled in the art without departing from the true spirit and scope of the invention as defined by the appended claims and their full scope of equivalents.

TABLE 1

Inbound and Outbound Channel Pairings For 600 MHz Sub-Split:

| Inbound Channel | Outbound Channel |
|---|---|
| 11.75–17.75 MHz | 636–642 MHz |
| 23.75–29.75 MHz | 630–636 MHz |
| 17.75–23.75 MHz | 624–636 MHz |
| 11.75–17.75 MHz | 618–624 MHz |
| 23.75–29.75 MHz | 612–618 MHz |
| 17.75–23.75 MHz | 606–612 MHz |
| 11.75–17.75 MHz | 600–606 MHz |
| 23.75–29.75 MHz | 594–600 MHz |
| 17.75–23.75 MHz | 588–594 MHz |
| 11.75–17.75 MHz | 582–588 MHz |
| 23.75–29.75 MHz | 576–582 MHz |
| 17.75–23.75 MHz | 570–576 MHz |
| 11.75–17.75 MHz | 564–570 MHz |
| 23.75–29.75 MHz | 558–564 MHz |
| 17.75–23.75 MHz | 552–558 MHz |

TABLE 2

Inbound and Outbound Pairings for 300 MHz Sub-Split:

| Inbound Channel | Outbound Channel |
|---|---|
| 23.75–29.75 MHz | 336–342 MHz |
| 17.75–23.75 MHz | 330–336 MHz |
| 11.75–17.75 MHz | 324–330 MHz |
| 23.75–29.75 MHz | 318–324 MHz |
| 17.75–23.75 MHz | 312–318 MHz |
| 11.75–17.75 MHz | 306–312 MHz |
| 23.75–29.75 MHz | 300–306 MHz |
| 17.75–23.75 MHz | 294–300 MHz |

TABLE 3

Inbound and Outbound Pairings for Japan Sub-Split:

| Inbound Channel | Outbound Channel |
|---|---|
| 23.75–29.75 MHz | 270–276 MHz |
| 17.75–23.75 MHz | 264–270 MHz |
| 35.75–41.75 MHz | 258–264 MHz |
| 29.75–35.75 MHz | 252–258 MHz |
| 23.75–29.75 MHz | 246–252 MHz |
| 17.75–23.75 MHz | 240–246 MHz |
| 35.75–41.75 MHz | 234–240 MHz |
| 29.75–35.75 MHz | 228–234 MHz |

What is claimed is:

1. A system for utility demand monitoring and control comprising:

a host computer having access to power utility customers for receiving customer utility usage data;

a plurality of network interfaces, each network interface associated with at least one customer's facility for relaying customer utility demand as collected from industrial equipment by a power monitoring unit;

a facility network connecting each power monitoring unit with a plurality of utility data collection units within said site for providing data on utility usage to the network interface associated with the facility; and a distribution network, coupled to said host computer, interconnecting said plurality of network interfaces for transmitting utility usage data from said plurality of network interfaces to said host computer, said distribution network being implemented within one or more time slots of a time-division multiplexed data stream carried by a high-speed digital bus, said one or more time slots carrying data in packet form, all network interfaces of said distribution network sharing said one or more slots.

2. The system of claim 1 wherein said single high speed digital bus include voice and data channels, and video channels.

3. The system of claim 1 wherein said high-speed digital bus comprises a combination of a fiber link, a coaxial link, and a wireless link.

4. The system of claim 1 further comprising a digital backbone network for coupling said distribution network and said host computer, said digital backbone network including a Frame Relay T1 interface between said distribution network and said digital backbone network and a Frame Relay router to interface between the digital backbone network and said host computer.

5. The system of claim 1 further comprising a digital backbone network for coupling said distribution network and said host computer, said digital backbone network including an ATM interface between said distribution network and an ATM interface router to interface between the digital backbone network and said host computer.

6. The system of claim 5 and further including a plurality of distribution networks each running from a power substation to a plurality of customer sites, said digital backbone network including a multiplexer for interfacing with said plurality of distribution networks.

7. The system of claim 1 wherein one of said plurality of data collection units monitors power usage for electrical power consumers within the site.

8. The system of claim 1 wherein said high-speed digital bus comprises a fiber optic link.

9. The system of claim 1 wherein said high-speed digital bus comprises a coaxial link.

10. The system of claim 1 wherein said high-speed digital bus comprises a wireless link.

11. The system of claim 1 wherein said high-speed digital bus employs Carrier Sense Multiple Access/Carrier Detect collision handling protocol.

12. The system of claim 1 wherein one or more time slots of said time-division multiplexed data stream carry voice data.

13. The system of claim 1 wherein one or more time slots of said timedivision multiplexed data stream carry video data.

14. The system of claim 1 wherein said network interface is coupled to said facility network by a power monitor unit.

15. The system of claim 1 wherein said network interface and said power monitor unit are integrated within an intelligent utility unit.

* * * * *